United States Patent
Oberhofer et al.

[15] 3,664,870

[45] May 23, 1972

[54] REMOVAL AND SEPARATION OF METALLIC OXIDE SCALE

[72] Inventors: Alfred W. Oberhofer, Alsip; Donald R. Anderson, Oswego; Charles C. Payne, Chicago, all of Ill.

[73] Assignee: Nalco Chemical Company, Chicago, Ill.

[22] Filed: Oct. 29, 1969

[21] Appl. No.: 872,411

[52] U.S. Cl. .................................... 134/3, 134/10, 134/22, 210/38
[51] Int. Cl. ............................... C23g 1/02, C23g 1/36
[58] Field of Search ........................ 134/3, 22, 10, 13, 27, 28, 134/29, 41; 210/38

[56] References Cited

UNITED STATES PATENTS

| | | | |
|---|---|---|---|
| 3,013,909 | 12/1961 | Pancer et al. | 134/3 |
| 3,033,214 | 5/1962 | Bersworth et al. | 134/13 |
| 3,072,502 | 1/1963 | Alfano | 134/3 |
| 3,116,240 | 12/1963 | Downey et al. | 134/41 X |
| 3,340,200 | 9/1967 | Noble | 210/38 X |
| 3,496,017 | 2/1970 | Weed | 134/3 X |

Primary Examiner—Morris O. Wolk
Assistant Examiner—Joseph T. Zatarga
Attorney—John G. Premo, Charles W. Connors and Edward A. Ptacek

[57] ABSTRACT

A method of removing metallic oxide scale from the cooling system of a nuclear reactor is disclosed. By forming complexes of the metals using ammoniated citric acid, the scale can be removed. By selectively adsorbing these complexes on ion exchange resins the scale can be separated.

5 Claims, No Drawings

REMOVAL AND SEPARATION OF METALLIC OXIDE SCALE

INTRODUCTION

Usually, boiler scale consists of metal carbonates, sulfates, and similar well-known salts. The scale in the cooling system of a nuclear reactor consists essentially of metallic oxides, although very minor amounts of other compounds could be present. These metallic oxides consist of copper, cobalt, and iron oxides. Minor substituents could be manganese, chromium, nickel, vanadium and titanium. The water used in the cooling system of a nuclear reactor is very pure. This accounts for the general absence of sulfates and carbonates.

The metallic oxide scale buildup in the cooling system of a nuclear reactor is not only significant but also difficult to cope with due to the radioactivity. If a process is devised for dissolving the crud or scale buildup inside the system, there is still the problem what to do with the radioactive crud. It cannot safely be disposed of in our waste streams.

A need exists for an improved method of removing scale and foreign material from the interior surfaces of such a system and concentrating the radioactive contaminants. It would be a benefit to the art if the long-life radioactive contaminants could be separated from the short-life radioactive contaminants. The necessary precautions could be practiced with the long-life radioactive contaminants, while the short-life contaminants would present less of a problem.

OBJECTS

It is an object of this invention to provide a method for easily dissolving, removing, and separating the metallic oxide scale or crud of the cooling system of a nuclear reactor.

It is a further object of this invention to provide a method for separating the long- and short-life radioactive substances of the crud from the nuclear reactor cooling system.

Other objects will be apparent to those skilled in the art.

THE INVENTION

The invention comprises chelating the metal compounds which make up the metallic oxide scale to form soluble complexes and removing these complexes from solution using ion exchange resins and appropriate pH adjustments.

Generally this invention involves a number of steps. First, a solution of chelating agent is added to the nuclear reactor cooling system. The solution of the chelating agent can range from 0.5–6 percent. The pH of the solution can range from 1.9 to 3.5 and preferably is about 3. Iron, cobalt, and some copper are then dissolved from the interior surfaces of the system containing the scale using the chelating solution. The temperature can range from 70° to 225° F., but preferably is maintained at 200° F.

The second step involves passing the solution at a temperature of 175° F. through a cation exchange resin. The cobalt complex is removed from solution in this step. Preferably the solution is then passed through another cation exchange resin to remove any traces of cobalt that remain in the solution. This is a polishing column.

Thirdly, the solution is then adjusted by the addition of chloride-free ammonia to a pH of from 5–7 and preferably a pH of from 5.5–6.5.

Fourthly, the solution is passed through a column containing an anion exchange resin. In this step most of the iron is removed and some of the copper. Preferably this step is followed by passing the solution through another anion exchange resin which removes any traces of iron still present in the solution.

Since the iron and the cobalt have been removed from the scale of the system, the fifth step is to remove the copper. The temperature of the solution is then about 150° F. The pH is adjusted using chloride-free ammonia to from 9–11. The solution is returned to the system to dissolve any remaining scale. Some of the citric acid is removed with the iron. Therefore, the solution now contains less citrate and more ammonia than previously. Thus, the solution is now more condusive for the dissolution of the copper. Now that the solution has been adjusted to a pH of from 9–11 the copper is dissolved using the ammonium citrate and preferably an oxidant. The oxidant could be sodium nitrite, ammonium persulfate, ammonium perborate, hydrogen peroxide, and any other well-known oxidants. Once the copper is dissolved by the formation of the chelating complex, the copper can be removed by passing it through a cation exchange resin.

Through this process, the scale from this system can be removed and separated into the cobalt complex, the iron complex, and the copper complex. The chelating agent also acts to pacify the metal surface and protect the surface from further corrosion.

Through this process, the crud of a nuclear reactor has been removed and separated into the cobalt complex which is the long-life radioactive substance and the iron and then the copper which are the short-life radioactive substances. The long-life radioactive substance, cobalt, after being adsorbed on the cation exchange resin can be buried.

The cation or anion exchange resins that adsorbed the short-life radioactive substances can be regenerated after the radioactive substance, iron and copper, have been dissipated. These resins are regenerated using any mineral acid or salt of a mineral acid. Preferably sulfuric acid is used because it is more efficient.

The invention can be better understood by reference to the following table.

TABLE I

| Metal | pH | Type of Resin | Form of Resin |
|---|---|---|---|
| Cobalt | 1.9–3.5 | cation | $NH_4^+$ |
| Iron and some Copper | 5–7 | anion | $OH^-$ |
| Copper 9–11 | | cation | $H^+$ |

Some of the parameters for the dissolution, removal and separation of the metal complexes can be easily compared. Cobalt is complexed at low pH and selectively adsorbed on a cation resin in the ammonium form. Conversely, copper is generally complexed at a high pH and adsorbed on a cation exchange resin in the hydrogen form. Iron and some copper are adsorbed at an intermittent pH and adsorbed on an anion exchange resin in the hydroxide form.

CHELATION

The chemistry of chelation is known to those skilled in the art. Briefly, chelation is a method of controlling the amount of metal ions in solution. If a compound contains two or more complexing sites which are capable of coordinating around the metal ion, this compound is called a chelating agent.

The chelating agent forms a water-soluble complex with the metal ion. Citric, gluconic and tartaric acids, ethylenediaminetetracetic acid (EDTA), nitrilotriacetic acid (NTA), and hydroxyethylenediaminetriacetic acid (HEDTA) are the most commonly used chelating agents. It has been found that in the practice of this invention citric acid is the preferred chelating agent.

Oxalic acid was tried in the place of the citric acid as a chelating agent. Because of limited solubility, the oxalic acid was replaced by the citric acid. Tartaric acid could be substituted for the citric acid.

The ammoniated citric acid is formed by reacting one mole of citric acid with one mole of ammonia. Ammoniated citric acid forms more soluble complexes with metals than unneutralized citric acid.

Just as chelating agents are capable of preventing the formation of many insoluble metal salts, the same principles can be put to use for dissolving already-formed scale. This may be understood more clearly if one considers that all "insoluble" materials have some degree of solubility, no matter how small. Metal salts, commonly thought of as insoluble, are actually in equilibrium with the soluble constituent ions.

If the metallic salt is removed in some fashion, then the equilibrium compensates by the release of additional soluble ions until the equilibrium is reestablished. A chelating agent functions by removing the ions through the formation of a chelate structure, and thus provides the mechanism by which the insoluble material dissolves.

Citric acid is an organic acid which forms metal complexes with many di- and trivalent ions. Citric acid is an especially effective chelating agent for copper, iron, cobalt and nickel ions. It is a white, crystalline, non-toxic compound, and is very soluble in water. When the complex is formed between the metal ions and the chelating agent it can be removed by isoporous and macroporous ion exchange resins.

By the practice of the invention cobalt, iron and copper oxides can be removed from a cooling system of a nuclear reactor. Other metallic oxides such as manganese, chromium, nickel, possibly even vanadium, and titanium, which may be present could also be removed. All of these metal ions are usually present as the oxides or as intermetallics.

This invention is unique in the fact that one complexing agent is used to complex all of the metal ions and by a simple procedure of using ion exchange resins the metal complexes can be selectively adsorbed from the solution. The solution can then be safely discharged.

Long-life materials are separated and removed from short-life materials, i.e., one of the isotopes of cobalt has a half-life of 5.2 years, while the half-life of one of the isotopes of iron is 45 days.

THE NUCLEAR REACTOR COOLING SYSTEM

In the typical 2,000-gallon reactor cooling system there is about 20 pounds of scale, commonly called crud. The iron, copper and cobalt are the main constituents of the crud. This crud consists of approximately 80 percent iron, 15 percent copper, and 5 percent cobalt. The longer the crud is allowed to accumulate, the harder it will be to dissolve.

If the amount of crud in the nuclear reactor cooling system is known the amount of citric acid needed can be calculated.

In order to dissolve the copper an oxidant should be added. The oxidant can be selected from the group consisting of sodium nitrate, ammonium persulfate, ammonium perborate, and hydrogen peroxide. The dissolution of copper proceeds according to the following equations:

$Fe^{+2} + oxidant \rightarrow Fe^{+3}$ compound $Fe^{+3}$ compound $+ Cu \rightarrow$ Ferrous compound $+ Cu^{+2} + Cu^{+1}$ The iron acts as a catalyst and comes from the bare metal of the equipment. A very small amount of iron is actually needed.

After the cobalt and iron are removed from solution, the solution is returned to the nuclear reactor cooling system and the oxidant is added to dissolve the copper.

This invention is particularly adapted to the cooling system of a nuclear reactor and metallic oxide scale.

OPERATING VARIABLES

The temperature can range from 70°–225° F. The pH to dissolve the cobalt and iron and form the chelating complex can range from 1.9 to 3.5. The cobalt is adsorbed on the cation exchange resin under these conditions. The flow rate can be one gallon per minute per cubic foot. Preferably, the flow rate should be 0.5 gallons per minute per cubic foot. Once the cobalt complex from the solution has been removed using the cation exchange resin, the pH is raised to from 5–7 with chloride-free ammonia and the iron complex is adsorbed from the solution using an anion exchange resin. The pH is then raised from 9–11 with ammonia, preferably an oxidant is used, and the remaining metal complexes are removed from the solution, including copper. This removal occurs by using a cation exchange resin.

The pressure used in this method should not exceed 50 psi. At a greater pressure, the citric acid will decompose rapidly.

THE ION EXCHANGE RESINS

The ion exchange resins that were used were polystyrene, macroporous resins. But any type of exchange resin could be used. Porous type resins are preferred.

The specific anion exchange resin used is No. 211 which is a new high capacity, high porosity, strong base anion exchange resin. This resin was obtained by copolymerizing polystyrene and chloromethylene. This was then aminated using known techniques and amines, such as trimethylamine and ethanol dimethylamine. Originally developed for severe operating conditions, No. 211 resin has been successfully adapted to decolorization and deionization of sugar syrups.

Resin 210, a high capacity cation exchange resin of medium porosity, is commercially available as perfect, strain-free beads with the high performance characteristics of premium quality resins. This resin is composed of polystyrene cross-linked with divinyl benzene. This is then sulfonated using sulfuric acid or chlorosulfonic acid. Produced from styrene-divinylbenzene, it is stronger, tougher, and more stable than other conventional resins. This resin is available as Resin 210-A which is the H form or as Resin 210-B which is the Na form.

Some of the physical and chemical properties of the specific resins used are given in the following table.

TABLE I.—PHYSICAL AND CHEMICAL PROPERTIES

| | Resin 211 | Resin 210-A | Resin 210-B |
|---|---|---|---|
| Physical form | Hard, cream-colored spheres, shipped moist in chloride form. | Hard golden-colored beads, shipped moist in hydrogen form. | Hard, golden-colored beads, shipped moist in sodium form. |
| Sphericity | 80% minimum | 90–95% typical | 90–95% typical. |
| Shipping weight | 44 lb./cu. ft. | 50 lb./cu. ft. | 53 lb./cu. ft. |
| Moisture content | 50–60% | 50–56% | 44–48%. |
| Standard screen size. | 20–40 mesh (wet). | 16–40 mesh (wet). | 16–40 mesh (wet). |
| On 16 mesh | 3% maximum | 15% maximum | 15% maximum. |
| Through 40 mesh | 3% maximum | 6% maximum | 6% maximum. |
| Through 50 mesh | | 1.0% maximum | 1.0% maximum. |
| Swelling | Approximately 30% from the chloride to the hydroxide forms. | | |
| Salt splitting capacity. | Cl⁻ form | H⁺ form | Na⁺ form. |
| Meg/g. dry resin | 3.7–4.3 | 4.8 | 4.5. |
| Meg/ml. wet resin. | 1.15–1.35 | 1.8 | 2.0. |
| Kgr./cu. ft. as CaCO₃. | 25–29 | 39.0 | 43.5. |
| Color throw APHA number. | | 40 maximum | 40 maximum. |

It is not necessary to use ion exchange resins having all of the properties listed in the above table. It would be obvious to one skilled in the art to substitute comparable ion exchange resins for those listed above.

In the practice of this invention, it was found that some forms of resins are preferred over other forms. For instance, to adsorb the copper complex, it was found that resin 210-A was preferred. For the iron complex, resin 211 was used, but is commercially available only in the chloride form. The hydroxide form is preferred. Therefore, to convert the resin from the chloride form to the hydroxide form, from 25 to 50 pounds of from 5 to 10 percent sodium hydroxide per cubic foot of resin is used. The contact time should be at least 1 hour. The effluent has to be tested for chloride, since chloride has a high corrosive effect on stainless steel. Therefore, if any chloride remains in the effluent, there would be a large amount of corrosion when the solution is returned to the nuclear reactor cooling system for the dissolution of the copper.

In order to adsorb the cobalt complex, resin 210 was used. But again a conversion is necessary. In order to convert resin 210-A, which is the H⁺form to the preferred NH₄⁺ form, from 10 to 15 pounds of ammonium hydroxide per cubic foot of resin was used. This is a relatively simple conversion since basically it is a neutralization in which the hydrogen and the hydroxide form water, leaving the ammonium ion on the resin. In order to convert resin 210-B which is the Na$^+$ form to the NH$_4^+$ form, from 50 to 75 pounds of ammonium hydroxide per cubic foot of resin was used. This conversion proceeds less rapidly.

Other forms of the resins could be used and comparable substitutions should be obvious to those skilled in the art.

In order to more thoroughly understand the invention, the following example is given.

EXAMPLE

Over 1,300 gallons of 4 percent by weight of ammoniated citric acid was added to a nuclear reactor cooling system. This solution was prepared by dissolving 440 pounds of citric acid monohydrate in 1,300 gallons of water. To form the ammoniated citric acid specie at pH 3.0, 17.8 pounds of 100 percent ammonia was added to one liter of the citric acid solution. The solution was heated to 200° F. and allowed to dissolve the iron and cobalt and some of the copper for 8 hours. The solution was then passed through a column of resin 210 in the ammonium form to remove the cobalt complex. The flow rate was 0.5 gal/min. About 90 g of cobalt were removed using 5.35 ft$^3$ of resin. The effluent showed 543 g of iron from the first column. The solution was then passed through another column of the same resin to remove any remaining cobalt that may have passed through the first column.

The pH of the solution is then raised to 6.0 using 53.4 pounds of 100 percent ammonia. The solution was then passed through 17.3 ft$^3$ of resin 211 in the OH$^-$ form to remove the iron complex. This was followed by a polishing column to remove any remaining iron. Almost all of the 543 g of Fe present were removed from the solution. The solution was then adjusted to raise the pH to 9.5 using 49.9 pounds of 100 percent ammonia. The temperature of the solution was lowered to 150° F. and then returned to the nuclear reactor cooling system to dissolve the copper. The solution was then passed through a column containing 31.6 ft$^3$ of resin 210-A which is in the H$^-$ form.

The effluent could then be stored for reuse. The scale had thus been dissolved, removed, and separated into the various components. The leakage values through all columns were: 0.08 ppm for cobalt; 0.3 ppm for iron; and 0.1 ppm for copper. Increasing the temperature was found to decrease the leakages. For instance, at 175° F., the leakages were below the detectable levels of 0.01 ppm for iron and copper and 0.1 ppm for cobalt.

Larger flow rates could be used. For instance, 1.0 gal/min/ft$^3$ could probably be satisfactory.

The cation and anion exchange resins containing adsorbed iron and copper can be regenerated. After the radioactivity is dissipated, the cation exchange resin can be regenerated using sulfuric acid. The copper has been adsorbed on the cation exchange resin and exists as a copper amine complex which is easily broken up. In using sodium chloride to regenerate the cation exchange resin, a 10 percent mixture is used and a slow flow rate.

To regenerate the anion exchange resin, about 15 pounds of sodium chloride per cubic foot of resin is used. After setting overnight, 5–10 pounds of additional sodium chloride are used.

Having thus described the invention what is claimed and desired to be protected by Letters Patent is:

1. A method of removing metallic oxide scale from the cooling system of a nuclear reactor which comprises the steps of:
   A. dissolving the scale at a pH of from 1.9 to 3.5 at a temperature of from 70°–225° F. in a 0.5–6 percent solution of ammoniated citric acid to form a solution of iron, cobalt, and copper complexes;
   B. removing the cobalt complex from the solution by passing the solution through a cation exchange resin;
   C. raising the pH of the solution to from 5–7 with ammonia;
   D. removing the iron complex from the solution by passing the solution through an anion exchange resin;
   E. raising the pH of the solution to from 9–11 with ammonia;
   F. returning the solution to the system to completely dissolve any remaining scale; and
   G. removing the copper complex from the solution by passing the solution through a cation exchange resin.

2. The method of claim 1 in which the scale is the crud from a nuclear reactor cooling system.

3. The method of claim 2 in which an oxidant selected from the group consisting of sodium nitrate, ammonium persulfate, ammonium perborate, and hydrogen peroxide is added after the pH is adjusted to from 9–11 with ammonia to enhance the dissolution of the copper.

4. The method of claim 3 including the additional step of:
   regenerating the ion exchange resins using a compound selected from the group consisting of mineral acids, and salts of mineral acids.

5. The method of claim 4 including the additional step of:
   treating the anion exchange resin with sodium hydroxide after regeneration.

* * * * *